(12) United States Patent
Ishihara

(10) Patent No.: US 9,489,153 B2
(45) Date of Patent: Nov. 8, 2016

(54) PRINT SERVER SYSTEM, METHOD FOR CONTROLLING THE SAME, AND PROGRAM

(71) Applicant: CANON KABUSHIKI KAISHA, Tokyo (JP)

(72) Inventor: Tomohiro Ishihara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/763,745

(22) PCT Filed: Jan. 8, 2014

(86) PCT No.: PCT/JP2014/000044
§ 371 (c)(1),
(2) Date: Jul. 27, 2015

(87) PCT Pub. No.: WO2014/115491
PCT Pub. Date: Jul. 31, 2014

(65) Prior Publication Data
US 2015/0363139 A1    Dec. 17, 2015

(30) Foreign Application Priority Data
Jan. 28, 2013  (JP) .................... 2013-013322

(51) Int. Cl.
*G06F 3/12* (2006.01)

(52) U.S. Cl.
CPC ............ *G06F 3/1203* (2013.01); *G06F 3/122* (2013.01); *G06F 3/1231* (2013.01); *G06F 3/1239* (2013.01); *G06F 3/1287* (2013.01); *G06F 3/1293* (2013.01)

(58) Field of Classification Search
None
See application file for complete search history.

(56) References Cited

U.S. PATENT DOCUMENTS

| 7,206,091 | B2 * | 4/2007 | Hagiuda | H04L 67/34 358/1.13 |
| 8,743,405 | B2 * | 6/2014 | Oishi | G06F 3/1204 358/1.1 |
| 8,854,672 | B2 * | 10/2014 | Yamada | G06F 3/1204 358/1.14 |
| 8,885,199 | B2 * | 11/2014 | Minagawa | G06F 3/1204 358/1.13 |
| 9,128,647 | B2 * | 9/2015 | Minagawa | G06F 3/1204 |

FOREIGN PATENT DOCUMENTS

| JP | 2005-044079 A | 2/2005 |
| JP | 2009-294931 A | 12/2009 |
| JP | 2012-155575 A | 8/2012 |
| JP | 2013-012066 A | 1/2013 |
| WO | 2011-115987 A2 | 9/2011 |

* cited by examiner

*Primary Examiner* — Dung Tran
(74) *Attorney, Agent, or Firm* — Canon U.S.A., Inc. IP Division

(57) ABSTRACT

The present invention relates to a print server system which suitably performs control of registration of a printer in accordance with a result of a determination as to whether an environment in which the printer is used corresponds to an enterprise environment. When the printer has been registered in a print service and a proxy is an enterprise supporting proxy, the printer is not registered whereas when the printer has been registered in the print service and the proxy is not the enterprise supporting proxy, multiple registration of the printer is performed by redundantly storing information on the printer.

14 Claims, 15 Drawing Sheets

Fig. 7

701
```
<Register>
   <name>
      <Item>MFP-01</Item>
   </name>
   <RPID>
      <Item>RP-0001</Item>
   </RPID>
   <Capabilities>
      <Duplex>
         <Item>1-Side</Item>
         <Item>2-Side</Item>
      </Duplex>
      <Color>
         <Item>mono</Item>
         <Item>color</Item>
      </Color>
      <PaperSize>
         <Item>B5</Item>
         <Item>A4</Item>
         <Item>A3</Item>
      </PaperSize>
   </Capabilities>
   <PrintSettings>
      <Duplex>
         <Item>1-Side</Item>
      </Duplex>
      <Color>
         <Item>color</Item>
      </Color>
      <PaperSize>
         <Item>A4</Item>
      </PaperSize>
   </PrintSettings>
   <MacAddress>
      <Item>00-11-22-33-44-55</Item>
   </MacAddress>
   <ProxyType>
      <Item>BrowserProxy</Item>
   </ProxyType>
   .........
</Register>
```

702
```
<Capabilities>
   <Duplex>
      <Item>1-Side</Item>
      <Item>2-Side</Item>
   </Duplex>
   <Color>
      <Item>mono</Item>
      <Item>color</Item>
   </Color>
   <PaperSize>
      <Item>B5</Item>
      <Item>A4</Item>
      <Item>A3</Item>
   </PaperSize>
   <UUID>
      </Item>12345678-80ab-cdef-ghij-klmnopqrstuv<Item>
   </UUID>
   <ProxyType>
      <Item>BrowserProxy</Item>
   </ProxyType>
</Capabilities>
```

Fig. 12

| PRINTER | PRINTER ID | PRINTER NAME | PROXY ID | CAPABILITIES | MANAGEMENT USER | MAC ADDRESS | PROXY TYPE |
|---|---|---|---|---|---|---|---|
| PRINTER A | 001 | PRINTER A | xx-xx-xx-xx | PAPER SIZE/… | USER 1 | xx-xx-xx-xx | NATIVE |
| PRINTER B | 002 | PRINTER B | yy-yy-yy-yy | PAPER SIZE/… | USER 2 | YY-YY-YY-YY | BROWSER PROXY |
| PRINTER C | 003 | PRINTER C | zz-zz-zz-zz | PAPER SIZE/… | USER 3 | zz-zz-zz-zz | SERVER PROXY |

1201

PRINT SERVER SYSTEM, METHOD FOR CONTROLLING THE SAME, AND PROGRAM

TECHNICAL FIELD

The present invention relates to a print server system which provides a print service, a method for controlling the print server system, and a program.

BACKGROUND ART

In general, servers provided with a print service in which a print instruction is transmitted from a client to a server and the server which receives the print instruction converts content data to be printed into print data have been used. In recent years, the concept of cloud computing has attracted attention which is one of configurations in which a server allows clients to use services. Cloud computing is mainly characterized in that data conversion and data processing are executed in a distributed manner using a number of computing resources so that a number of requests from clients are simultaneously processed. Nowadays, some vendors implement print services in a cloud computing environment which realizes cloud computing so as to provide various types of print service. However, in such a print service, securing of server resources in an appropriate manner is an important matter for efficiently processing a large number of user requests.

In general web services, a maker name and a model name of a device of a user, for example, are used as information (device information) and user information for identifying the user and the device information are stored after being associated with each other. Therefore, the device is registered in a state in which the device is associated with the user. In the registration of a device, the device information and the user information are associated with each other on a one-to-one basis and multiple registration of the same device is forbidden.

However, there arises a problem in that a plurality of users share a single device in some cases, and therefore, users other than a user associated with the device are not allowed to use a web service in the system of the general web service. In PTL 1, a method for enabling registration of users other than a user associated with a device even if the device has been registered by a device registration method has been proposed.

CITATION LIST

Patent Literature

PTL 1: Japanese Patent Laid-Open No. 2009-294931

SUMMARY OF INVENTION

Technical Problem

Although a print service has been released as a service for consumers in standard homes, small offices, and the like, it is anticipated that the print service will be provided for enterprises such as large companies and large offices in the future. Since information management for reducing a load of a server is required to support both the consumer environment and the enterprise environment, multiple registration of a printer is required to be more strictly prevented.

However, when the print service is made to support both the consumer environment and the enterprise environment, some creative thinking is required to prevent the multiple registration of a printer. This is because, if the multiple registration of a printer is forbidden in the print service without taking use cases of the printer in the consumer environment and the enterprise environment into consideration, usability of the print service may be deteriorated. In PTL 1, prevention of the multiple registration of a printer in the print service in both the consumer environment and the enterprise environment is not considered.

The present invention provides a print server system which appropriately performs printer registration control in accordance with a result of a determination as to whether an environment in which a printer is used is an enterprise environment.

Solution to Problem

A print server system according to an embodiment of the present invention includes a print service which transmits a print job for a registered printer through a network. The print server system includes a reception unit configured to receive a request for registering a printer, information on the printer to be registered, and information on a proxy having a function of receiving a print job from the print service and transmitting the print job to the printer, a determination unit configured to determine, when the printer has been registered in the print service, whether the proxy is an enterprise supporting proxy capable of restricting use of the print service in accordance with the received information on the proxy, and a registration control unit configured not to register the printer when the determination unit determines that the proxy is the enterprise supporting proxy and configured to perform multiple registration of the printer by redundantly storing the received information on the printer when the determination unit determines that the proxy is not the enterprise supporting proxy.

Further features of the present invention will become apparent from the following description of exemplary embodiments with reference to the attached drawings.

BRIEF DESCRIPTION OF DRAWINGS

FIG. 7 is a diagram illustrating printer information according to the first embodiment.

FIG. 12 is a diagram illustrating a printer management table and a user management table according to the second embodiment.

DESCRIPTION OF EMBODIMENTS

Figure 1:
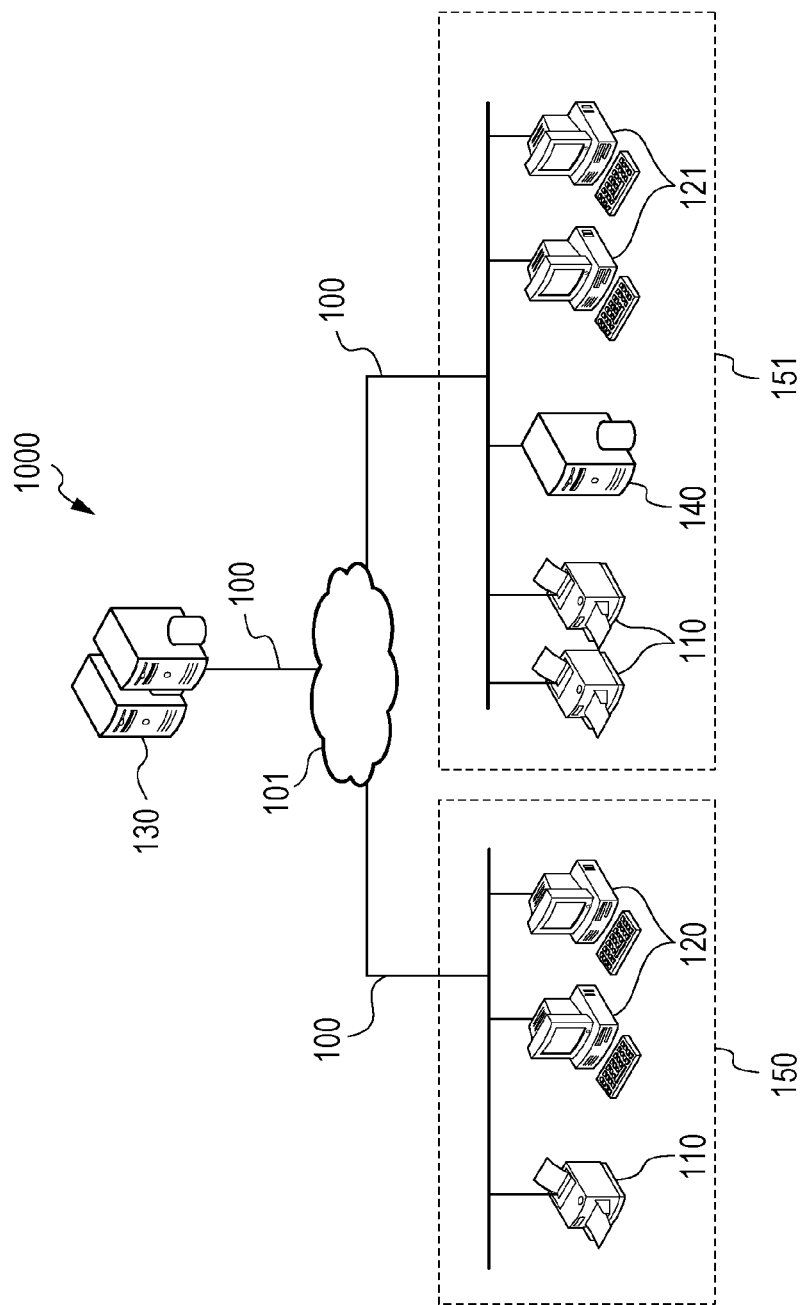
FIG. 1 is a diagram illustrating a configuration of a content print system according to a first embodiment.

Embodiments of the present invention will be described hereinafter with reference to the accompanying drawings.
First Embodiment When multiple registration of a printer is prevented, unnecessary registration of information in a print service may be suppressed and server resources may be efficiently utilized. However, if the multiple registration of a printer is forbidden without taking the environment of the printer into consideration, usability is deteriorated. In a first embodiment, a method for appropriately controlling registration of a printer in accordance with a result of a determination as to whether a printer to be registered in the print service operates in an enterprise environment will be described in detail.

First, a difference between a "consumer environment" and an "enterprise environment" will be described. In the consumer environment, a small number of people share a printer, and use of the printer and registration of the printer in a print service are not especially restricted, that is, individual users may freely use the print service. On the other hand, in the enterprise environment such as offices of large companies, printers are integrally managed by a printer server in accordance with a policy set by an administrator. Registration of a printer in a print service is performed only by the administrator in accordance with the policy and general users are not allowed to freely register a printer in the print service.

When printing is performed from a client using a printer in the enterprise environment, a general user may not directly perform printing using the printer from the client. The user accesses a printer server from the client and communicates with the printer through the printer server for printing. Note that when printing is performed through communication with the printer using the printer server, the printer may be used only in a range specified by the policy of the printer server. For example, operation is restricted such that only two-side printing is allowed to be performed and/or only monochrome printing is allowed to be performed.

Next, a "printer sharing function" of the print service will be described. This function is provided for a management user who manages a printer which has been registered in the print service, and allows general users who have permission granted by the management user to use the printer registered in the print service. When a sharing setting is set for the registered printer, the printer is shared. Note that, when the user sets the sharing setting, the print service manages information such that information on a plurality of users is associated with information on the registered printer. Therefore, when the sharing setting is set, the amount of unnecessary printer information is not increased. Accordingly, the load of the server may be reduced and the burden on a user is reduced since an operation of registering the printer is not required to be performed by the user.

The print service is used with a configuration illustrated in FIG. 3 which will be described hereinafter. Specifically, in the configuration, a particular personal computer (PC) which mediates between the print service and the printer is activated. Although the particular PC is required to be activated when the printer sharing function is utilized, use of the printer sharing function is not appropriate in the consumer environment. This is because the particular PC should be in an on state all the time. Furthermore, if the particular PC is activated every time the print service is used, the burden on a user is large and usability is low. Therefore, in the consumer environment, instead of the use of the printer sharing function of a printer, a configuration in which multiple registration of a printer is allowed is appropriate taking usability into consideration.

Specifically, use of the printer sharing function reduces a load of registration of a printer performed by a user and a load of the server in the enterprise environment whereas permitted multiple registration improves the usability of the print service in the consumer environment. Outline of the first embodiment has been described hereinabove.

Next, a configuration and processing for realizing the first embodiment will be described. First, a configuration of a content print system 1000 according to the first embodiment will be described. FIG. 1 is a diagram illustrating the configuration of the content print system 1000. A consumer environment 150 and an enterprise environment 151 in the content print system 1000 have different configurations. The consumer environment 150 includes a printer 110 and clients 120. The printer 110 and the clients 120 are installed in a user environment and connected to one another through a network 100 which is connected to the Internet 101. The printer 110 and the clients 120 may be connected to one another through the Internet 101. Furthermore, connection using a local interface such as a USB connection may enable data communication.

The enterprise environment 151 includes the printers 110, clients 121, and a printer server 140. The printers 110, the clients 121, and the printer server 140 are installed in the user environment and connected to one another through the network 100 which is connected to the Internet 101. The printers 110, the clients 121, and the printer server 140 may be connected to one another through the Internet 101. Furthermore, the content print system 1000 includes a print server group 130. The devices and the servers included in the content print system 1000 may be connected to one another through the Internet 101 so as to perform data communication. Although a plurality of servers are included in the print server group 130, only one server may be included in the print server group 130. Note that, since the number of servers which provide a print service is not limited, a configuration including a plurality of servers such as the print server group 130 and a configuration including a single server are both referred to as the print server system.

Figure 2:
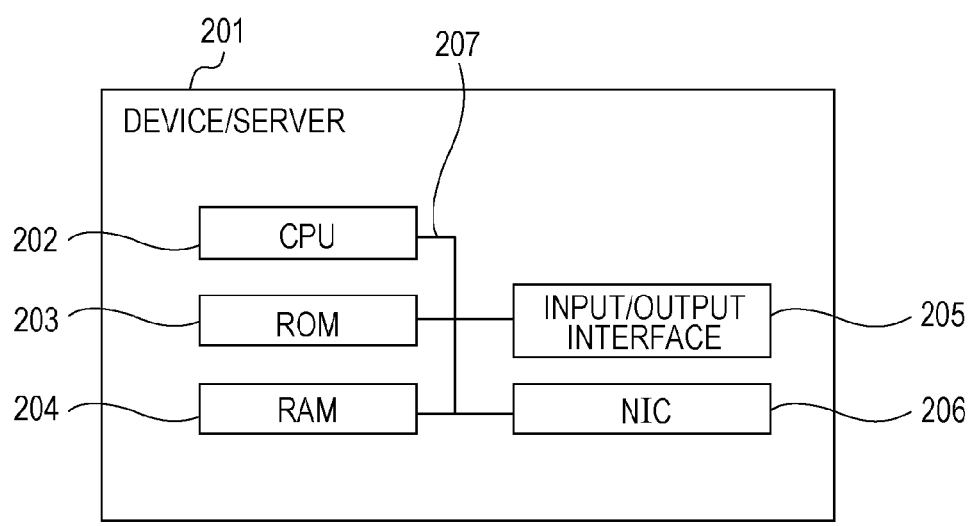
FIG. 2 is a diagram illustrating a hardware configuration of each of devices and server groups included in the content print system according to the first embodiment.

Next, hardware configurations of the devices and the servers included in the content print system 1000 will be described. FIG. 2 is a diagram illustrating a hardware configuration of each of the devices and the servers included in the content print system 1000. A reference numeral 201 denotes each of the devices and the servers included in the content print system 1000. A central processing unit (CPU) 202 executes various programs so as to realize various functions. A read only memory (ROM) 203 stores various programs. The CPU 202 loads the programs stored in the ROM 203 into a RAM 204 and executes the programs.

Furthermore, the RAM 204 is also a unit used as a temporal working storage region of the CPU 202. An input/output interface 205 is an interface unit which transmits data to the devices and displays (not illustrated) connected to the servers and receives data from a pointing device (not illustrated). A network interface card (NIC) 206 is a unit for connecting the devices and the servers included in the content print system 1000 to the network 100. The units described above are capable of transmitting and receiving data through a bus 207. Furthermore, print control units included in the printers 110 include respective printing units (not illustrated) which are capable of transmitting data to and receiving data from the other units through the bus 207. The printing units are capable of printing image data such as a raster image in a recording medium such as a recording sheet. The printers 110 may be other multifunction devices which further include an image processing unit such as a scanner unit.

Figure 3A:
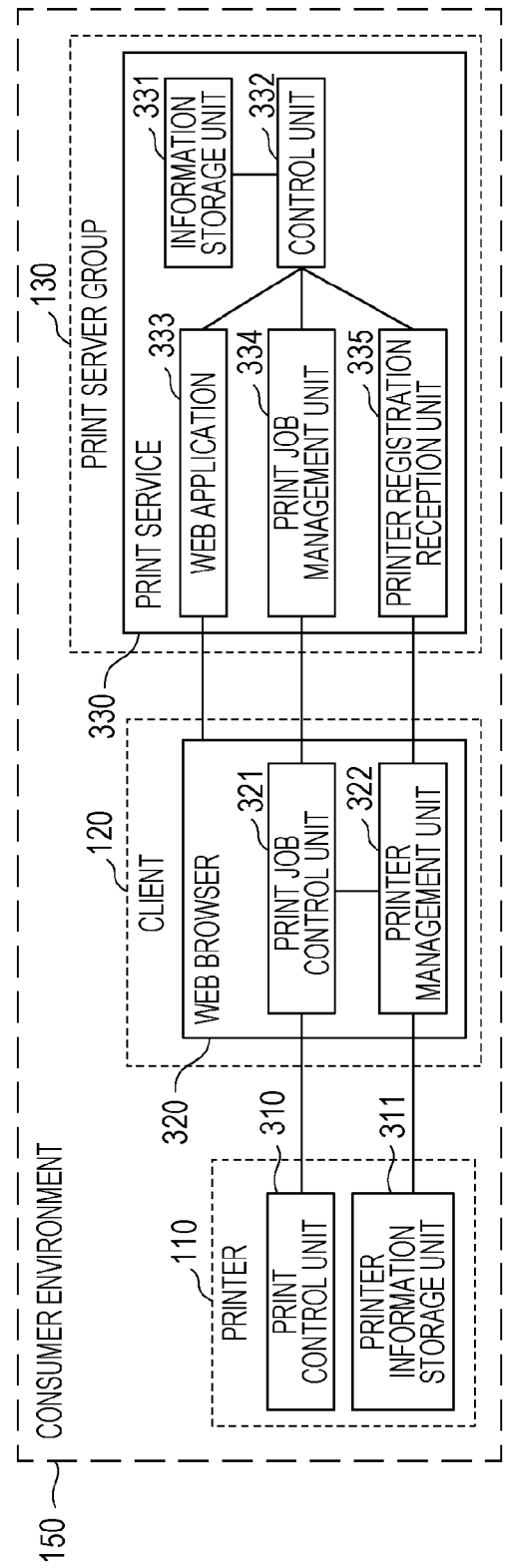
FIG. 3A is a diagram illustrating software configurations of the devices and the server groups included in the content print system in a consumer environment according to the first embodiment.
Figure 3B:
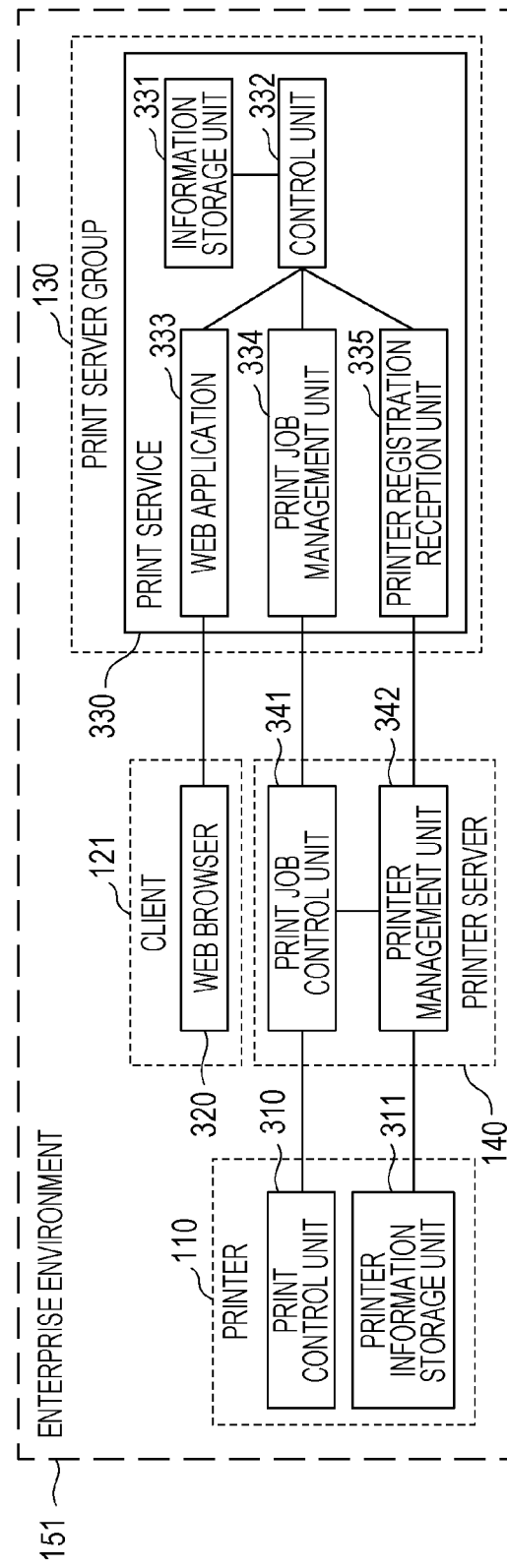
FIG. 3B is a diagram illustrating software configurations of the devices and the server groups included in the content print system in an enterprise environment according to the first embodiment.

Next, software configurations of the devices and the servers included in the content print system 1000 will be described. FIG. 3A is a diagram illustrating a software configuration of each of the devices of the consumer environment 150 and the servers included in the content print system 1000. FIG. 3B is a diagram illustrating a software configuration of each of the devices of the enterprise environment 151 and the servers included in the content print system 1000. Programs which realize functions of the software configurations illustrated in FIGS. 3A and 3B are stored in the ROMs 203 of the devices and the servers, and the software configurations are realized when the CPUs 202 load the programs into the RAMs 204 and execute the programs.

The print server group 130 including a plurality of servers is virtually regarded as a single server which realizes functions of a print service 330. In the print server group 130, a plurality of virtual machines are activated in the single virtual server and a function of the print service 330 is realized for each virtual machine. The print service 330 illustrated in FIGS. 3A and 3B corresponds to one of the virtual machines.

First, the consumer environment 150 of FIG. 3A will be described. The print service 330 includes an information storage unit 331, a control unit 332, a web application 333, a print job management unit 334, and a printer registration reception unit 335. The control unit 332 controls cooperation of software included in the print service 330. The information storage unit 331 is a database which stores information on registered printers and information on accounts of users. The web application 333 receives various requests from a web browser 320 and provides UIs such as a login screen and a printer management screen of the print service 330 for the web browser 320. The print job management unit 334 controls generation of a print job and transmission of a print job to a print job control unit 321 of the client 120 in response to a print instruction supplied from the web browser 320 included in the client 120. A print job is generated by the print job management unit 334 in accordance with content data and a print setting set by the user. The printer registration reception unit 335 receives a printer registration request supplied from a printer management unit 322 of the client 120 and determines whether registration is to be performed in accordance with a flowchart described below.

The client 120 includes the web browser 320 which further includes the print job control unit 321 and the printer management unit 322. The web browser 320 communicates with the web application 333 of the print service 330 so as to obtain the login screen and the printer management screen of the print service 330 and realizes various operations. The print job control unit 321 communicates with the print job management unit 334 of the print service 330 so as to receive a print job corresponding to printing specified by the web browser 320. The print job control unit 321 further communicates with a print control unit 310 of the printer 110 so as to transmit the print job to the printer 110. The printer management unit 322 manages information on the printer 110. The printer management unit 322 communicates with a printer information storage unit 311 of the printer 110 so as to obtain the information on the printer 110.

The obtained information includes a printer name, capabilities, identification information, and so on, and details of the information will be described hereinafter. The printer management unit 322 further communicates with the printer registration reception unit 335 of the print service 330 so as to transmit a printer registration request together with the information. A combination of the print job control unit 321 and the printer management unit 322 used for cooperation with the print service 330 is referred to as a "proxy", and a device having a proxy is referred to as a "proxy device". The print job control unit 321 which receives a print job from the print service 330 and transmits the print job to the printer 110 may be referred to as a "proxy". The proxy is a function of the web browser 320 in the case illustrated in FIG. 3A, and the proxy device corresponds to the client 120. The consumer environment 150 is characterized in that each of the web browsers 320 included in the clients 120 operated by individual users correspond to the proxy. The users may use the print service 330 by activating the web browsers 320 of the clients 120 operated by the users.

The printer 110 is connected to the client 120 and the network 100 so as to perform communication. The printer 110 includes the print control unit 310 and the printer information storage unit 311. The print control unit 310 receives a print job from the print job control unit 321 of the client 120 and performs printing of the job. The printer information storage unit 311 stores information such as the printer name, the capabilities, and the identification information of the printer 110 and transmits the information in response to an information obtaining request supplied from the printer management unit 322 of the web browser 320.

Next, the enterprise environment 151 illustrated in FIG. 3B will be described. The print service 330 includes the information storage unit 331, the control unit 332, the web application 333, the print job management unit 334, and the printer registration reception unit 335. Operations of the information storage unit 331, the control unit 332, and the web application 333 are the same as those of the consumer environment 150, and therefore, descriptions thereof are omitted. The print job management unit 334 controls generation of a print job and transmission of a print job to a print job control unit 341 of the printer server 140 in response to a print instruction supplied from the web browser 320 included in the client 121. The printer registration reception unit 335 receives a printer registration request supplied from a printer management unit 342 of the printer server 140 and determines whether registration of a printer is to be performed in accordance with a flowchart described below.

The client 121 includes the web browser 320. The web browser 320 communicates with the web application 333 of the print service 330 so as to obtain the login screen and the printer management screen of the print service 330 and realizes various operations.

The printer server 140 includes the print job control unit 341 and the printer management unit 342. The print job control unit 341 communicates with the print job management unit 334 of the print service 330 and receives a print job from the print job management unit 334 when the web browser 320 instructs printing. Furthermore, the print job control unit 341 communicates with a print control unit 310 of the printer 110 so as to transmit the print job to the printer 110. Moreover, the print job control unit 341 performs control such that a print job which does not satisfy the policy is not transmitted to the printer 110 in accordance with the policy set in the printer server 140 when the print job is to be transmitted to the printer 110. For example, when a policy stating that color printing is forbidden and/or a policy stating that only two-side printing is permitted is applied to the printer server 140, a print job which is not in line with the policy is not transmitted to the printer 110 even when the print job is attempted to be supplied to printers.

The printer management unit 342 manages information on the printer 110. The printer management unit 342 communicates with the printer information storage unit 311 of the printer 110 so as to obtain information on the printer 110. The obtained information includes a printer name, capabilities, identification information, and so on, and details of the information will be described hereinafter. The printer management unit 342 further communicates with the printer registration reception unit 335 of the print service 330 so as to transmit a printer registration request. Moreover, the printer management unit 342 performs control such that the information on the printer 110 is modified in accordance with the policy and registered in the print service 330. For example, when the policy that color printing is forbidden is applied to the printer server 140, if color information is included in the obtained printer information, the printer information is registered in the print service 330 after the color information is removed.

A function of receiving a print job from the print service 330 and transmitting the print job to the printer 110 and a function of collecting printer information and registering the printer information with the print service 330 of the print job control unit 341 and the printer management unit 342 are the same as those of the print job control unit 321 and the printer management unit 322. Therefore, the printer server 140 including the print job control unit 341 and the printer management unit 342 is also a proxy device. The print job control unit 341 and the printer management unit 342 control transmission of a print job as described above, and in addition, the print job control unit 341 and the printer management unit 342 further include a function of restricting registration of printer information. Such a proxy capable of restricting use of a print service is referred to as an "enterprise supporting proxy". On the other hand, a proxy which does not restrict use of a print service as illustrated in FIG. 3A is referred to as a "consumer supporting proxy".

The printer 110 is connected to the printer server 140 and the network 100 so as to perform communication. The printer 110 includes the print control unit 310 and the printer information storage unit 311. The print control unit 310 receives a print job from the print job control unit 341 of the printer server 140 and performs printing of the job. The printer information storage unit 311 stores printer information which is the same as that stored in the printer information storage unit 311 of FIG. 3A. The printer information storage unit 311 transmits various information in response to an information obtaining request supplied from the printer management unit 342 of the printer server 140.

User information and the printer information registered in the print service 330 are stored in the information storage unit 331. The information storage unit 331 stores the printer information (a printer ID, a printer name, a proxy ID, capabilities, identification information, a proxy type, and so on) and the user information (a user account and a password) such that the information on a user who has registered a printer and the printer information are associated with each other. The information is transmitted from the printer management unit 322 of the web browser 320 or the printer management unit 342 of the printer server 140 to the print service 330 and stored in the information storage unit 331.

Figure 6:
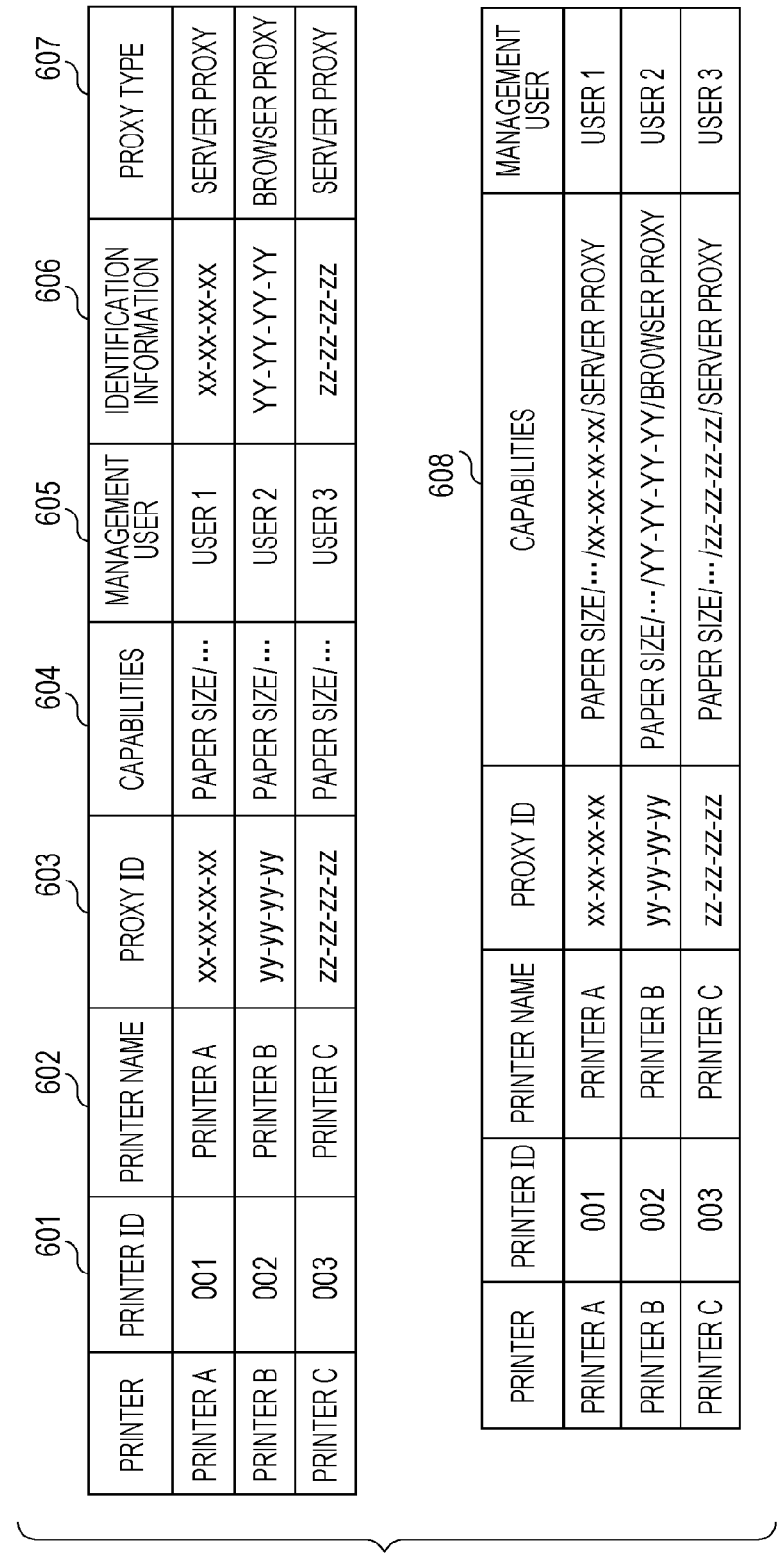
FIG. 6 includes diagrams illustrating a printer management table and a user management table according to the first embodiment.

FIG. 6 is a diagram illustrating information stored in the information storage unit 331. The printer ID is denoted by a reference numeral 601, the printer name is denoted by a reference numeral 602, the proxy ID is denoted by a reference numeral 603, the capabilities are denoted by a reference numeral 604, a management user account is denoted by a reference numeral 605, the identification information is denoted by a reference numeral 606, and the proxy type is denoted by a reference numeral 607. Here, information including the identification information 606 and the proxy type 607 may be described and managed as a portion of information representing the capabilities as denoted by a reference numeral 608.

The printer ID is identification information uniquely assigned by the print service 330 so as to be used by the print service 330 to manage the printer 110. The printer name is assigned to the printer 110 and used to refer to the printer 110. The printer name is different from the identification information and a number of printers may have the same printer name. The proxy ID is unique identification information of the client 120 and the printer server 140. As the unique identification information, a MAC address, a UUID, or a unique ID may be used. Although a format of the MAC address is used in FIG. 6, other formats may be used. When a user selects a printer from among registered printers, the print job management unit 334 refers to a proxy ID of the selected printer and specifies a destination of transmission of a print job in accordance with the referenced proxy ID.

The capabilities include information on a determination as to whether the printer is capable of performing two-side printing, information on a determination as to whether the printer is capable of performing color printing, and information on a size of paper to be able to output, for example. The user account is user identification information which is uniquely assigned by the print service 330 to a user. The identification information is identification information uniquely assigned to a printer. As the unique identification information, a MAC address, a UUID, or a unique ID may be used. Although a format of the MAC address is used in FIG. 6, other formats may be used.

The proxy type is information included in the print job control unit 321 of the client 120 and the print job control unit 341 of the printer server 140. This information is used to determine whether a proxy is the consumer supporting proxy or the enterprise supporting proxy. In a case of the consumer supporting proxy, "Browser Proxy" is described whereas in a case of the enterprise supporting proxy, "Server Proxy" is described.

Specifically, a proxy installed in an information processing apparatus (such as the printer server 140) which mediates between printers and a printer server group and which is capable of integrally managing the printers corresponds to the "Server Proxy", that is, the enterprise supporting proxy. When the enterprise supporting proxy is employed, print control of print jobs transmitted from the print server group may be integrally managed by the printer server 140. Furthermore, since print jobs are integrally managed by the printer server 140, use of the print service 330 is restricted, and in addition, the number of times printing using the print service 330 is performed may be counted for each user. Accordingly, an optimum printing environment is attained for office use.

The information transmitted from the printer management unit 322 of the client 120 or the printer management unit 342 of the printer server 140 to the printer registration reception unit 335 has a format denoted by a reference numeral 701 of FIG. 7. The information 701 to be transmitted at a time of registration of the printer includes the printer name 602, the proxy ID 603, the capabilities 604, the identification information 606, and the proxy type 607. Although items representing the identification information and the proxy type are independently described in the information 701, they may be included and transmitted as items of the capabilities as denoted by a reference numeral 702. Furthermore, the identification information, the information of the proxy type, and so on may be directly transmitted in an independent manner using an API of the print service 330 or the like at a time of a registration request. When registration of a printer is to be performed through the proxy of the enterprise environment, the printer server 140 modifies the capabilities in accordance with the policy before registering the printer. For example, if color printing is forbidden by the policy even when a printer to be registered supports color printing, "capabilities" is modified such that only monochrome printing is allowed.

Figure 4:
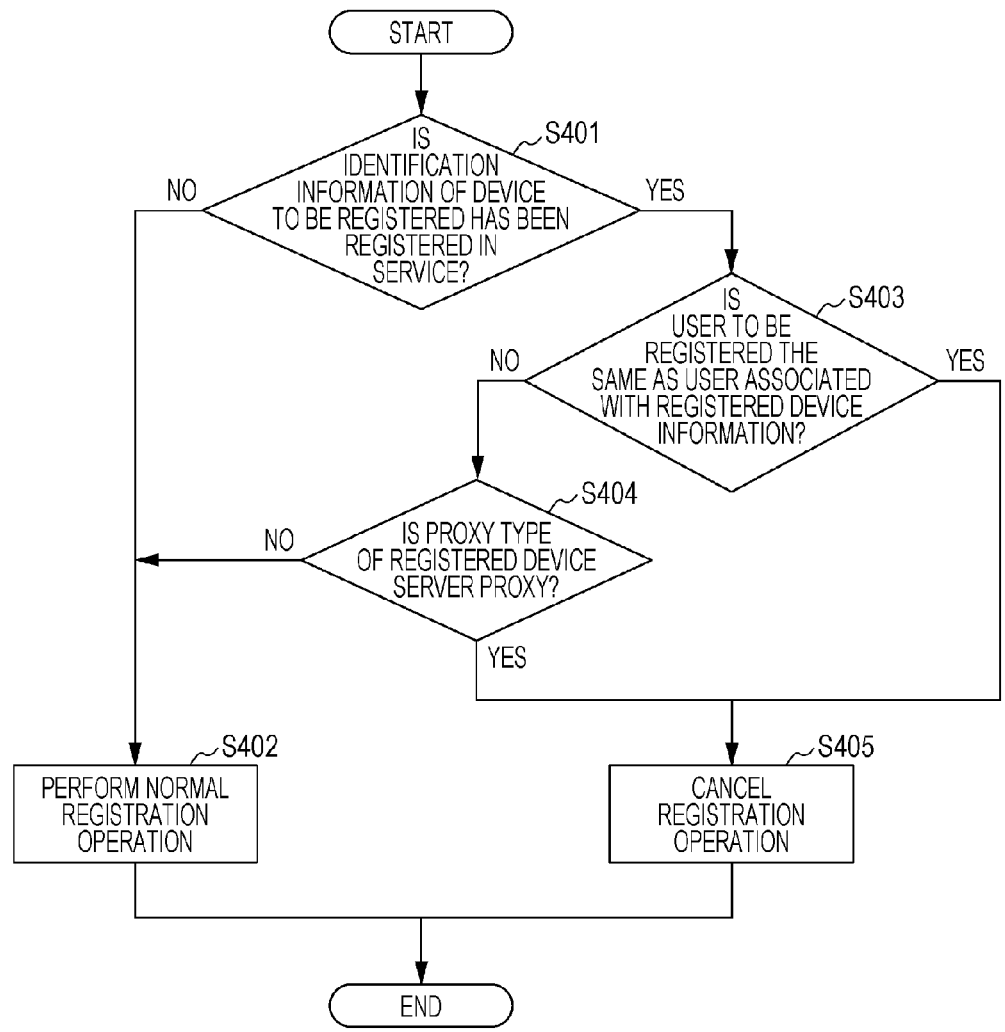
FIG. 4 is a flowchart illustrating registration of a printer in a print service according to the first embodiment.

Next, a registration control process performed when the printer 110 is registered in the print service 330 will be described with reference to a flowchart of FIG. 4. When the printer registration reception unit 335 receives a printer registration request from the proxy, the print service 330 determines whether a target printer has been registered in the print service 330 (S401). Specifically, the print service 330 compares identification information included in the printer registration request with identification information included in printer information stored in the information storage unit 331 and determines that the printer has been registered when the identification information included in the printer registration request matches the identification information included in the printer information, and otherwise, determines that the printer has not been registered. When the printer has not been registered in the print service 330, the process proceeds to step S402 where a normal registration operation is performed, and the process is terminated. When the printer has been registered, the process proceeds to step S403 where it is determined whether a user who is performing the registration operation so as to be associated with the printer to be registered is the same as a user who is associated with the printer which has been registered in the print service 330.

Specifically, user information stored while being associated with information on the printer of step S401 is compared with user information supplied from the proxy so that it is determined whether the user information associated with the information on the printer of step S401 and the user information supplied from the proxy are the same as each other. When the same user is detected, the registration operation is cancelled since registration of the same printer by the same user is forbidden, and the flow is terminated (S405). When the same user is not detected, the process proceeds to step S404 where the print service 330 determines whether the proxy type included in the information on the printer of step S401 corresponds to "Server Proxy" (S404). When the proxy type corresponds to "Server Proxy", the enterprise environment is detected and the registration operation is cancelled (S405). When the proxy type does not correspond to "Server Proxy", the consumer environment is detected, and the process proceeds to step S402 where the normal registration operation is performed.

Note that a setting value used to determine whether registration to the print service 330 by other users is accepted may be independently provided, and when the determination is affirmative in accordance with the setting value, the process may proceed to step S402 whereas when the determination is negative in accordance with the setting value, the process may proceed to step S405. When the determination is negative in step S404 and therefore the process proceeds to step S402, the information on the printer is redundantly stored, that is, multiple registration of the printer is performed. Here, although the information on the printer is redundantly stored, individual information on the printers is stored while being associated with information on corresponding users, and therefore, the same user does not perform the multiple registration of the printer.

Figure 5:
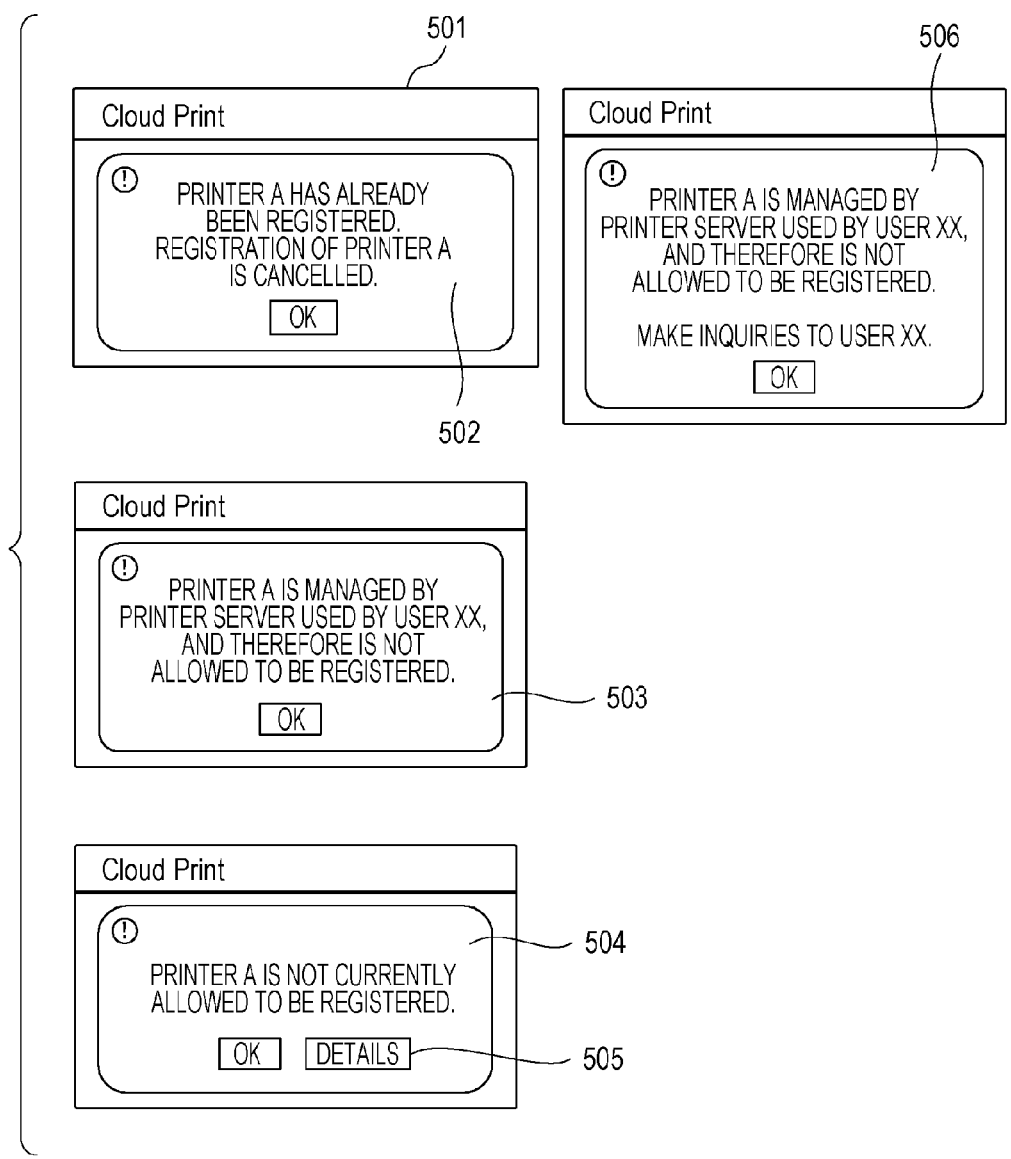
FIG. 5 is a diagram illustrating UIs representing that registration of a printer is cancelled according to the first embodiment.

When the registration operation is cancelled in step S405, the web application 333 displays user interfaces (UIs) illustrated in FIG. 5. A reference numeral 501 denotes a certain screen of the print service 330 which displays a UI 502 including a message stating that the registration operation is cancelled. Alternatively, a UI 503 including a message stating that another user manages the printer may be displayed instead of the UI 502. Furthermore, a UI 504 including a message stating that the registration is refused and a detail button 505 may be displayed instead of the UI 502, and when the detail button 505 is pressed, detailed information may be displayed as a UI 506, for example.

As described above, when a printer which has been registered is to be registered, multiple registration of the printer is forbidden in the enterprise environment whereas multiple registration of the printer by the same user is forbidden and multiple registration of the printer by another user is accepted in the consumer environment. Accordingly, when a print service supporting the consumer environment and the enterprise environment is used, usability is not deteriorated and a load of a server of the print service may be reduced since unnecessary registration of a printer is prevented.

Second Embodiment

In recent years, in addition to general printers, cloud supporting printers which are suitable for a cloud print service have been developed by various vendors. Such a cloud supporting printer is characterized in that the printer and the print service are directly communicated with each other so as to perform printing without using a client and a printer server which are illustrated in the first embodiment. Specifically, as illustrated in a configuration of FIG. 9 described below, when such a cloud supporting printer is used, a particular PC is not required when printing is performed. Therefore, the problem in which a particular PC is required to be activated and therefore usability is deteriorated when the printer sharing function of the print service described in the first embodiment is used is solved. Furthermore, when the printer sharing function is used, registration of the same printer performed by different users is avoided and therefore a load of a server is reduced.

Accordingly, the cloud supporting printer is preferably used after a sharing setting is set on a service side.

Note that the cloud supporting printer may communicate with the print service through a client and a printer server as illustrated in the first embodiment. In this case, the cloud supporting printer performs the same operation as general printers. In the description below, a case where the cloud supporting printer directly communicates with the print service is referred to as use or registration as a cloud supporting printer whereas a case where the cloud supporting printer communicates with the print service through a client and a printer server is referred to as use or registration as a normal printer.

With this situation in mind, a method for controlling registration of a printer which has been registered performed when a cloud supporting printer is used in the environment of the first embodiment will be considered. First, when a printer which is being used as a cloud supporting printer is to be registered as a cloud supporting printer again in a print service by the same user, it is determined that multiple registration is to be performed, and therefore, the registration is to be refused. Even when another user performs this re-registration, the re-registration is preferably refused since the printer sharing function is preferably used.

Next, when a printer which is being used as a cloud supporting printer is to be registered as a normal printer which performs printing through the device including the proxy described in the first embodiment by the same user, it is simply determined that multiple registration is to be performed, and therefore, the registration is to be refused. Even when another user performs this re-registration, the re-registration is preferably refused since the printer sharing function is preferably used.

Finally, when a printer which is being used as a normal printer is to be registered as a cloud supporting printer in the print service by the same user, it is simply determined that multiple registration is to be performed, and therefore, the registration is to be refused. When another user performs this registration, as with the case of the first embodiment, an environment of the printer is further detected and when a consumer environment is detected, the registration is preferably accepted whereas when an enterprise environment is detected, the registration is preferably refused.

That is, multiple registration of a printer which has been registered as a cloud supporting printer is refused irrespective of a user and an environment, and in other situations, a determination the same as that of the first embodiment is made. Hereinafter, a configuration, information, and a processing flow of a content print system including a cloud supporting printer will be described in detail.

Figure 8:
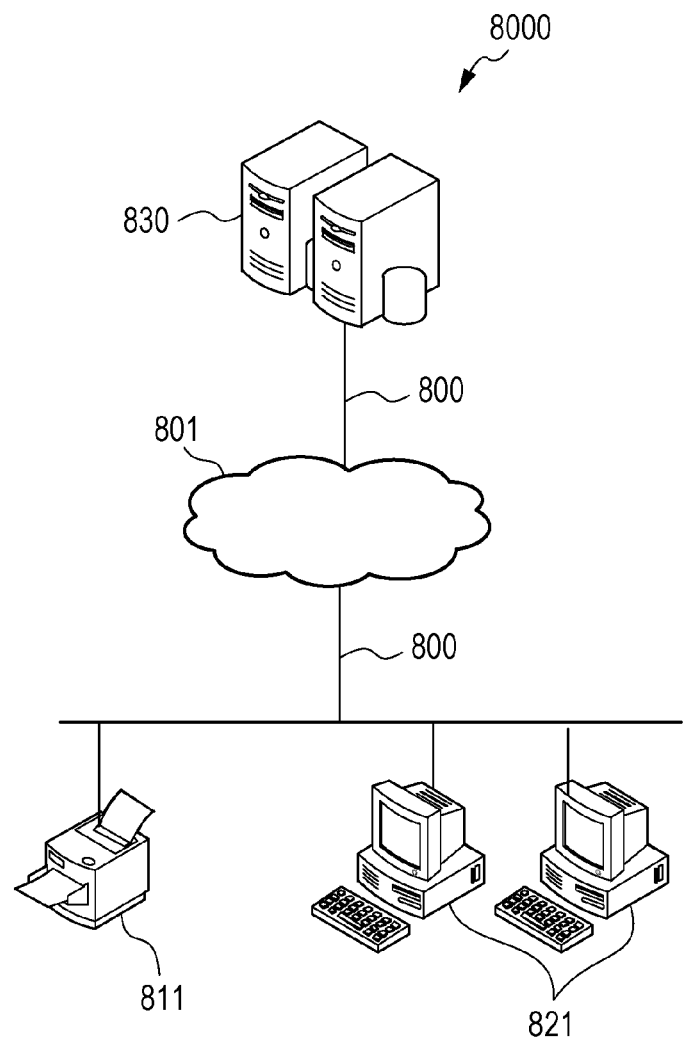
FIG. 8 is a diagram illustrating a configuration of a content print system according to a second embodiment.

First, a configuration of a content print system 8000 including a cloud supporting printer 811 will be described. FIG. 8 is a diagram illustrating the configuration of the content print system 8000 Unlike the first embodiment, an environment including the cloud supporting printer 811 is commonly used as a consumer environment and an enterprise environment. The content print system 8000 includes the cloud supporting printer 811 and clients 821. The cloud supporting printer 811 and the clients 821 are installed in a user environment and connected to one another through a network 800 which is connected to the Internet 801. The cloud supporting printer 811 and the clients 821 may be connected to one another through the Internet 801. The content print system 8000 further includes a print server group 830. The devices and the servers included in the content print system 8000 may be connected to one another through the Internet 801 so as to perform data communication.

Although the only one cloud supporting printer 811 is used in FIG. 8, a plurality of cloud supporting printers 811 may be used, and furthermore, although a plurality of clients 821 and a plurality of servers in the print server group 830 are used in FIG. 8, a single client 821 and a single print server included in the print server group 830 may be used. Furthermore, although not illustrated in FIG. 8, the cloud supporting printer 811 may be simultaneously included in the consumer environment 150 and the enterprise environment 151 illustrated in FIG. 1. Specifically, the print server group 830 is connected to, in addition to the cloud supporting printer 811, the consumer environment 150 and the enterprise environment 151 through the network 800. This situation is assumed in a second embodiment. Furthermore, the cloud supporting printer 811 may be used as the general printer 110 with the configuration illustrated in FIG. 1. Hardware configurations of the devices and the servers included in the content print system 8000 are the same as those illustrated in FIG. 2 of the first embodiment, and therefore, descriptions thereof are omitted.

Figure 9:
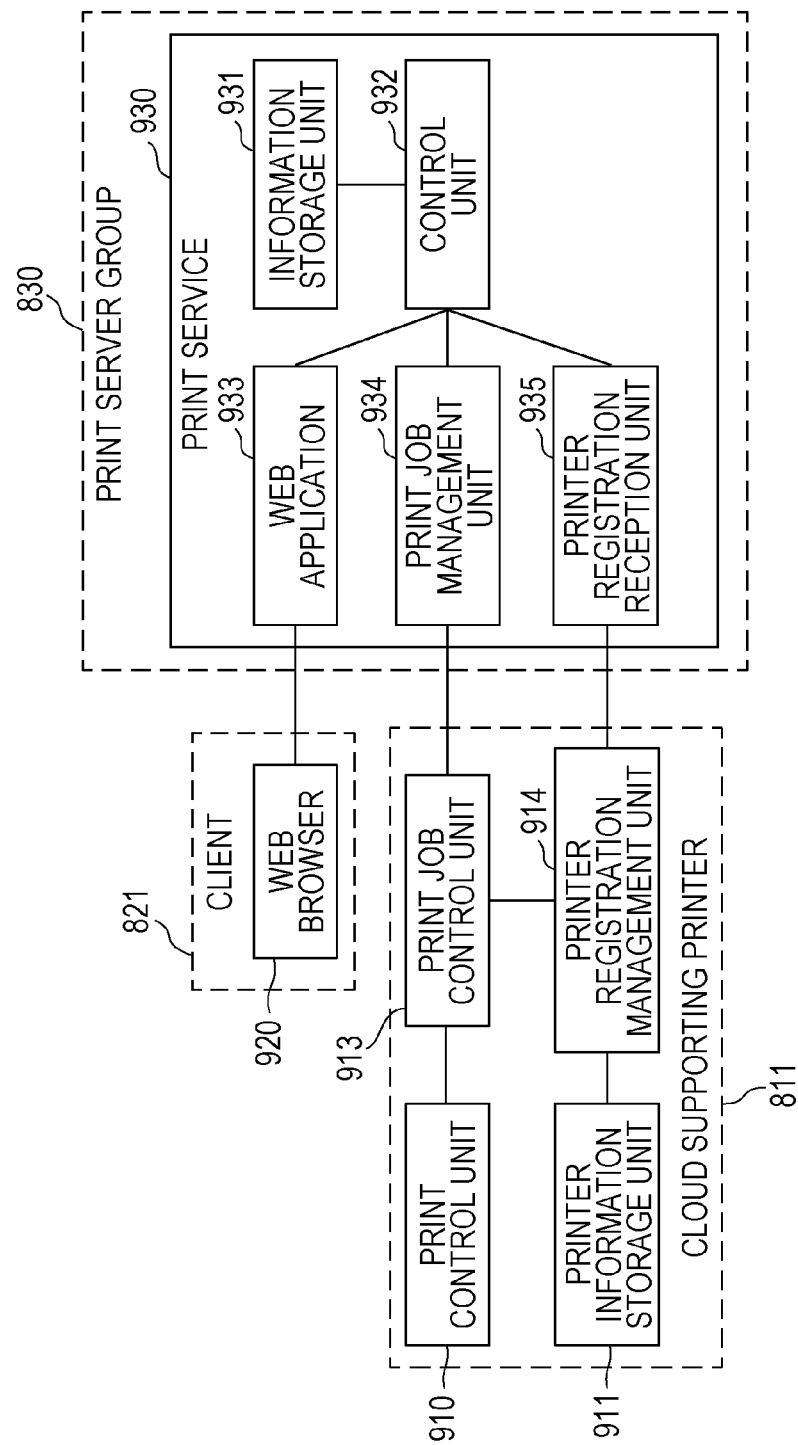
FIG. 9 is a diagram illustrating software configurations of devices and server groups included in the content print system according to the second embodiment.

Next, software configurations of the devices and the servers included in the content print system 8000 will be described with reference to FIG. 9.

A print service 930 includes an information storage unit 931, a control unit 932, a web application 933, a print job management unit 934, and a printer registration reception unit 935. Operations of the information storage unit 931, the control unit 932, and the web application 933 are the same as those of the consumer environment 150 illustrated in FIG. 3A, and therefore, descriptions thereof are omitted. The print job management unit 934 controls generation of a print job and transmission of a print job to a print job control unit 913 included in the cloud supporting printer 811 in response to a print instruction supplied from a web browser 920 included in a client 821. The printer registration reception unit 935 receives a printer registration request supplied from a printer registration management unit 914 of the cloud supporting printer 811 and determines whether registration is to be performed in accordance with a flowchart described below. When it is determined that the registration is to be performed, the printer registration reception unit 935 transmits a ticket used to receive a print job to the printer registration management unit 914 of the cloud supporting printer 811. Specifically, the print service 930 has a function which is equivalent to that of the print service 330, that is, the functions of the print service 930 and the print service 330 are not different from each other. The client 821 includes the web browser 920. The web browser 920 is the same as the web browser 320 illustrated in FIG. 3B, and therefore, a description thereof is omitted.

The cloud supporting printer 811 includes a print control unit 910, a printer information storage unit 911, the print job control unit 913, and the printer registration management unit 914. The print control unit 910 receives a print job from the print job control unit 913 and performs printing of the job. The printer information storage unit 911 stores printer information similarly to the printer information storage unit 311 illustrated in FIG. 3A. The print job control unit 913 communicates with the print job management unit 934 so as to receive a print job corresponding to printing specified by the web browser 920. The print job control unit 913 transmits the received print job to the print control unit 910. The printer registration management unit 914 communicates with the printer registration reception unit 935 of the print service 930 so as to transmit the printer information of itself stored in the printer information storage unit 911 to the print service 930 along with a registration request.

The print job control unit 913 and the printer registration management unit 914 have a function used to cooperate with the print service 930, that is, a proxy function. Specifically, a cloud supporting printer means a printer which performs printing by receiving a print job from the print service 930 without using an information processing apparatus including a proxy. In other words, a printer including a proxy is referred to as a cloud supporting printer, and the cloud supporting printer directly receives a print job from the print service 930.

User information and the printer information registered in the print service 930 are stored in the information storage unit 931. The information stored in the information storage unit 931 is illustrated in FIG. 12. A difference between the information in FIG. 12 and the information in FIG. 6 of the first embodiment will be described.

Information stored as a proxy ID serves as identification information unique to a cloud supporting printer. If the information stored as the proxy ID has the same format as information stored as identification information, the same values are stored, which is allowable. Therefore, the same format may be used or different formats may be used. Information stored as a proxy type represents that a printer is a cloud supporting printer as denoted by a reference numeral 1201. A proxy of the consumer environment is represented by "Browser Proxy", a proxy of the enterprise environment is represented by "Server Proxy", and a proxy of a cloud corresponding printer is represented by "Native" in a description below.

Figure 10:
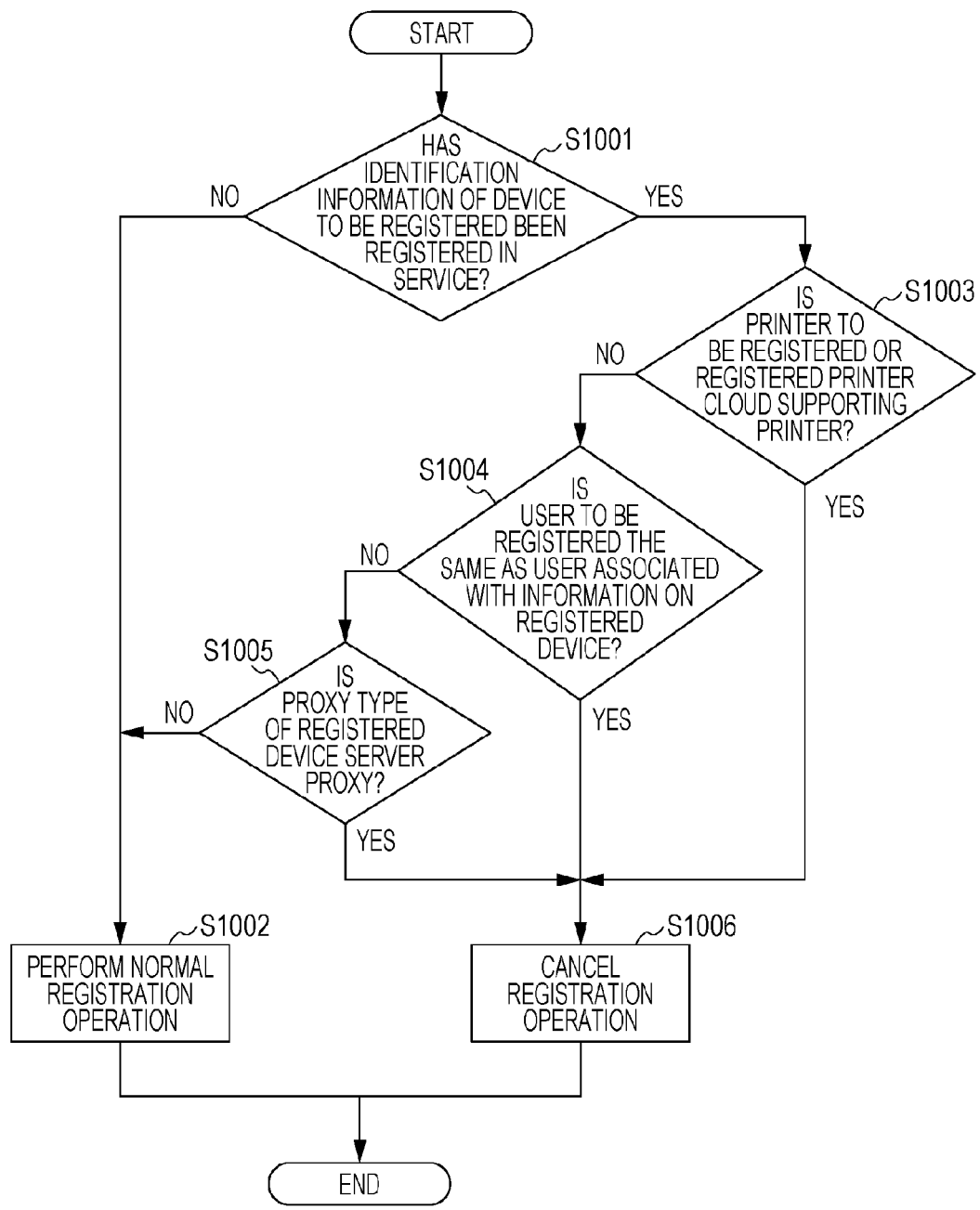
FIG. 10 is a flowchart illustrating registration of a printer in a print service according to the second embodiment.

A method for controlling registration of a printer to the print service 930 according to the second embodiment will be described with reference to a flowchart of FIG. 10. When the printer registration reception unit 935 receives a printer registration request, the print service 930 determines whether a target printer has been registered in the print service 930 (S1001). Specifically, the print service 930 compares identification information included in the printer registration request with identification information included in printer information stored in the information storage unit 931 and determines that the printer has been registered when the identification information included in the printer registration request matches the identification information included in the printer information, and otherwise, determines that the printer has not been registered. When the printer has not been registered in the print service 930, the process proceeds to step S1002 where a normal registration operation is performed, and the flow is terminated. When the printer has been registered, the process proceeds to step S1003 where it is determined whether the printer of step S1001 is a cloud supporting printer.

Specifically, when a proxy type included in printer information of the printer of step S1001 represents "Native", it is determined that the printer is a cloud supporting printer. When the printer is a cloud supporting printer, the process proceeds to step S1006 where the registration operation is cancelled. When the printer is not a cloud supporting printer, the process proceeds to step S1004 where it is determined whether a user who is performing the registration operation so as to be associated with the printer to be registered matches a user who is associated with the printer which has been registered in the print service 930.

Specifically, user information stored while being associated with the information on the printer of step S1001 is compared with user information supplied from the proxy so that it is determined whether the user information associated with the information on the printer of step S1001 and the user information supplied from the proxy are the same as each other. When the same user is detected, the registration operation is cancelled, and the flow is terminated (S1006). When the same user is not detected, the process proceeds to step S1005 where the print service 930 determines whether the proxy type included in the printer information of step S1001 corresponds to "Server Proxy". When the proxy type corresponds to "Server Proxy", the registration operation is cancelled (S1006). When the proxy type does not correspond to "Server Proxy", the process proceeds to step S1002 where the normal registration operation is performed.

Figure 11:
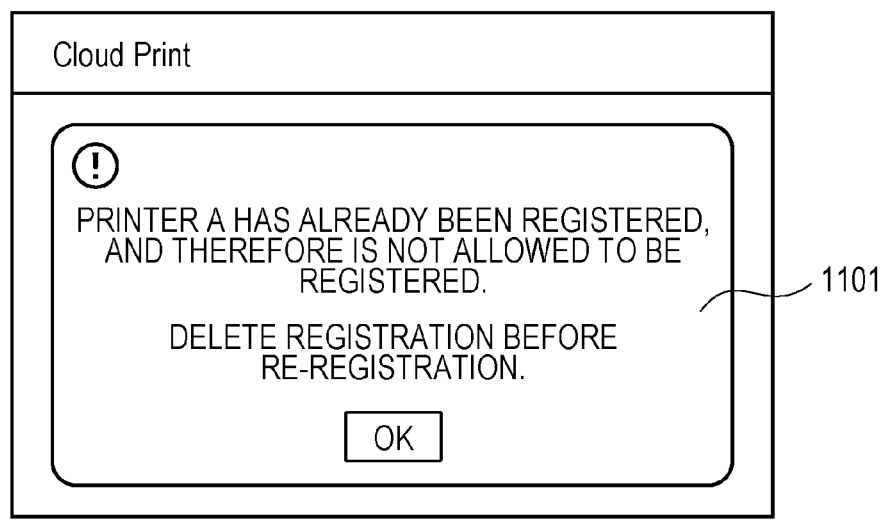
FIG. 11 is a diagram illustrating a UI representing that registration of a printer is cancelled according to the second embodiment.

When the registration operation is cancelled in step S1006, the web application 933 of the print service 930 displays a UI 1101 including a message stating that the registration operation is cancelled as illustrated in FIG. 11. Specifically, information on a printer which is connected to the print server group 830 while not being managed by the printer server 140 is removed from the print server group 830 before being registered again through the printer server 140.

Accordingly, when a print service which supports an environment in which a cloud supporting printer is employed is used, usability is not deteriorated and a load of a server of the print service may be reduced since unnecessary registration of a printer is prevented.

Third Embodiment

The UIs of the first and second embodiments are difficult for a user to react when the registration operation is cancelled, and therefore, usability is low. In a third embodiment, a method for displaying a UI indicating a concrete corresponding method for using a printer will be described. A configuration of a print system, hardware configurations, software configurations, and stored information of a third embodiment are the same as those of the first and second embodiments, and therefore, descriptions thereof are omitted.

Figure 13:
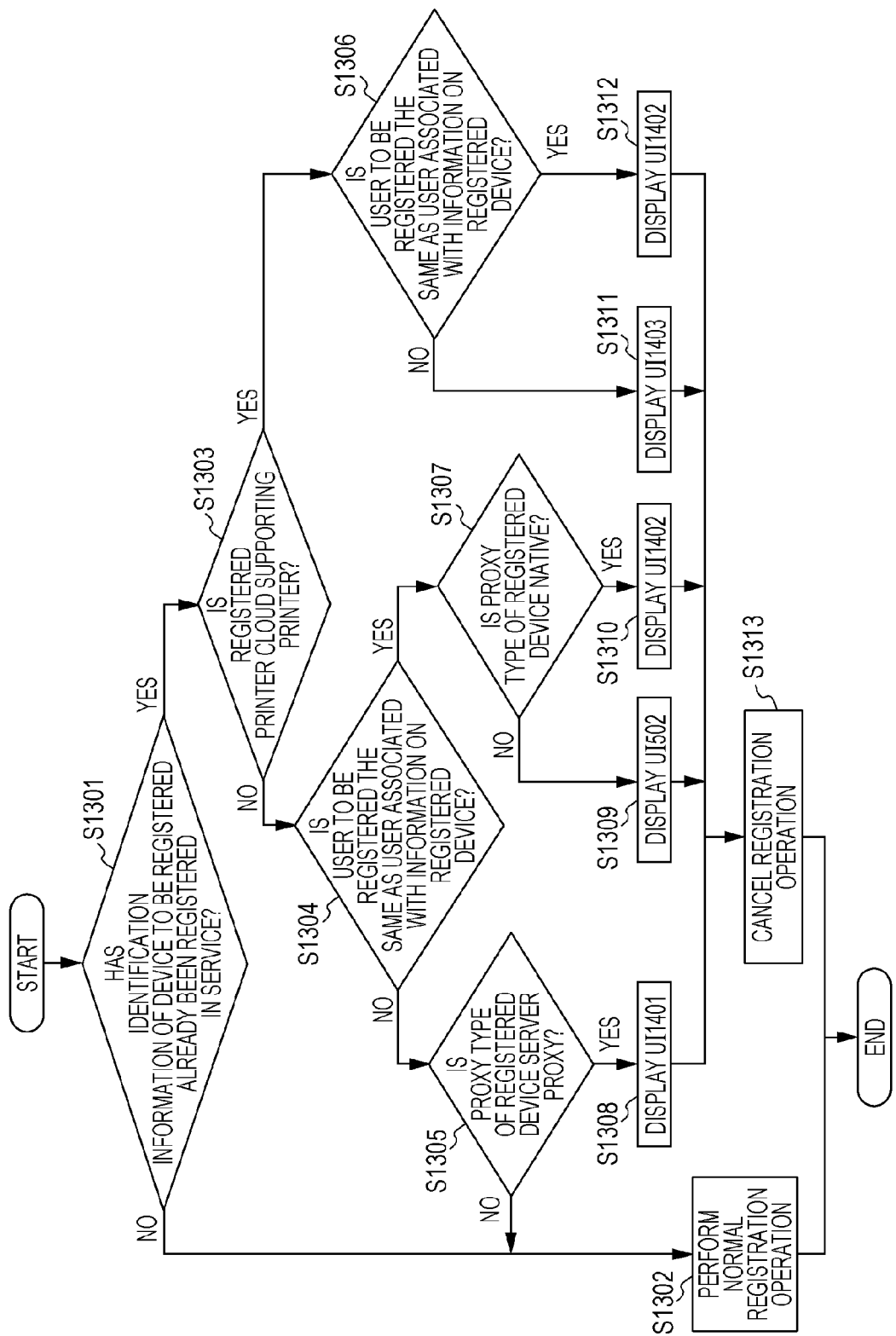
FIG. 13 is a flowchart illustrating registration of a printer in a print service according to a third embodiment.
Figure 14:
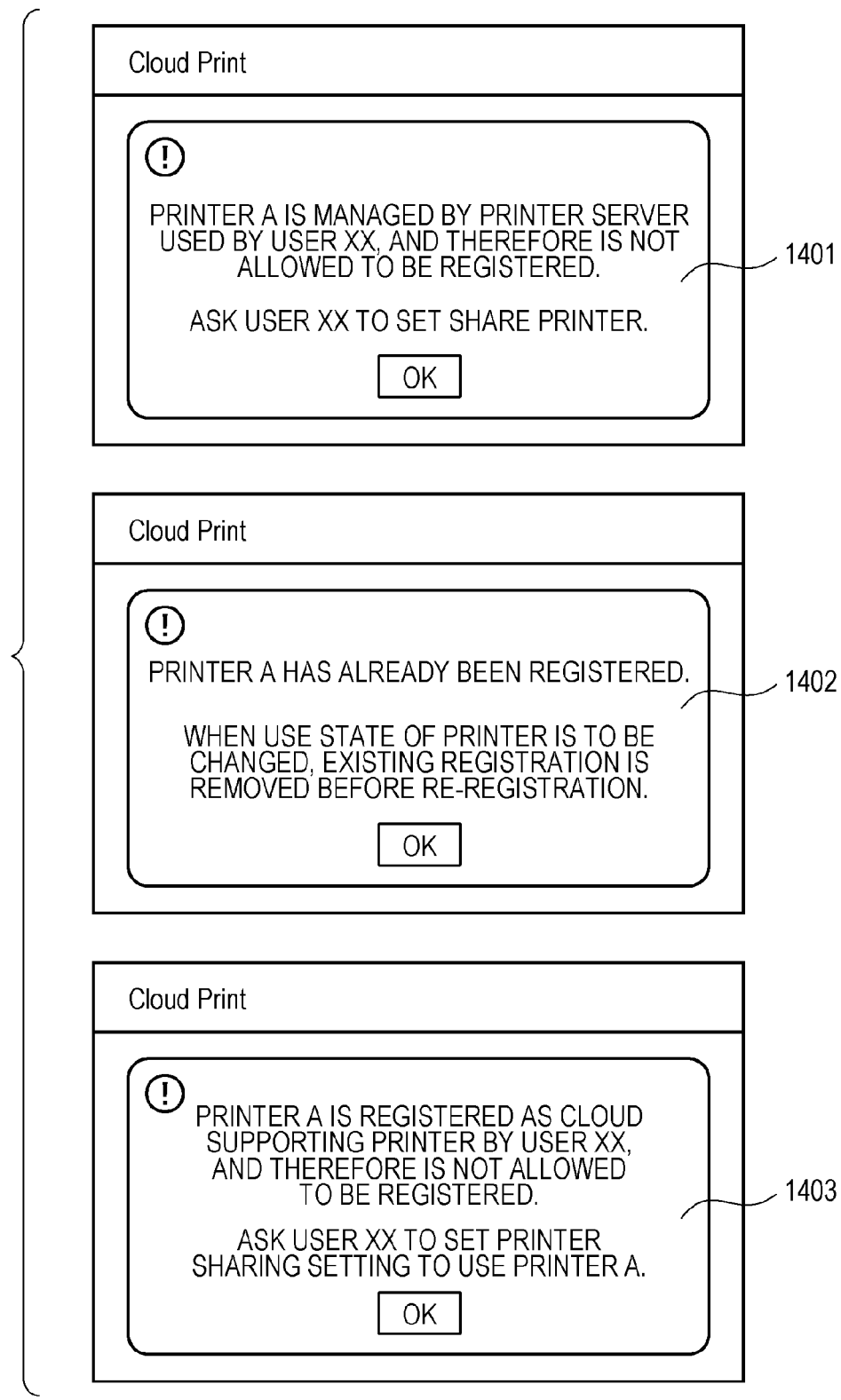
FIG. 14 is a diagram illustrating UIs representing that registration of a printer is cancelled according to the third embodiment.

A method for controlling registration of a printer to a print service will be described with reference to a flowchart in FIG. 13 and UIs in FIG. 14. Software units are described with reference to the second embodiment. When a printer registration reception unit 935 receives a printer registration request, a print service 930 determines whether a target printer has been registered in a print service 930 (S1301). Specifically, the print service 930 compares identification information included in the printer registration request with identification information included in printer information stored in an information storage unit 931 and determines that the printer has been registered when the identification information included in the printer registration request matches the identification information included in the printer information, and otherwise, determines that the printer has not been registered. When the printer has not been registered in the print service 930, the process proceeds to step S1302 where a normal registration operation is performed, and the flow is terminated. When the printer has been registered, the process proceeds to step S1303 where it is determined whether the printer of step S1301 is a cloud supporting printer.

Specifically, when a proxy type of information on the printer of step S1301 represents "Native", it is determined that the printer is a cloud supporting printer. When the printer is not a cloud supporting printer, the process proceeds to step S1304 where it is determined whether a user who is performing the registration operation matches a user who is associated with the printer which has been registered. Specifically, user information stored while being associated with the information on the printer of step S1301 is compared with user information supplied from a proxy so that it is determined whether the user information associated with the information on the printer of step S1301 and the user information supplied from the proxy are the same as each other.

When the same user is detected, the process proceeds to step S1307 where it is further determined whether the proxy type of the registered printer corresponds to "Native". When the proxy type of the registered device corresponds to "Native", the process proceeds to step S1310, and a UI 1402 including a message stating that re-registration is required after the registration which has been made is removed when a use state of the printer is to be changed is displayed. When the proxy type of the registered device does not correspond to "Native", the process proceeds to step S1309 where a UI 502 of FIG. 5 including a message stating that the printer has been registered is displayed. After the UI is displayed, the registration operation is cancelled and the flow is terminated (S1313). When the same user is not detected in step S1304, the process proceeds to step S1305 where the print service 930 determines whether the proxy type included in the printer registration request corresponds to "Server Proxy". When the proxy type corresponds to "Server Proxy", the process proceeds to step S1308 where a UI 1401 including a message which states that the printer is not allowed to be registered since the printer is managed by an administrator and which prompts a sharing setting is displayed. Thereafter, the process proceeds to step S1313 where the registration operation is cancelled. When the proxy type does not correspond to "Server Proxy", the process proceeds to step S1302 where the normal registration operation is performed.

When it is determined that the registered printer is a cloud supporting printer in step S1303, the process proceeds to step S1306. In step S1306, it is determined whether information on a user who is performing the registration is the same as user information associated with information on the registered printer. When the same user is detected, the process proceeds to step S1312 where the UI 1402 including the message stating that re-registration is required after the registration which has been made is removed when a use state of the printer is to be changed is displayed. After the UI is displayed, the registration operation is cancelled, and the flow is terminated (S1313). When the same user is not detected, the process proceeds to step S1311 where a UI 1403 including a message which states that the printer has been registered as a cloud supporting printer and which prompts the sharing setting is displayed. Thereafter, the registration operation is cancelled (S1313).

As described above, since the multiple registration of a printer is prevented and UIs representing concrete corresponding methods for using the printer may be appropriately displayed in accordance with an environment of the printer to be registered, usability is improved.

Other Embodiments

The present disclosure may be realized by executing the following process. That is, software (programs) which realizes the functions of the foregoing embodiments is supplied through a network or various storage media to a system or a device, and a computer (or a CPU, an MPU, or the like) of the system or the device reads and executes the programs.

According to the present disclosure, control of registration of a printer may be appropriately performed in accordance with a determination as to whether an environment in which the printer is used is an enterprise environment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-013322, filed Jan. 28, 2013, which is hereby incorporated by reference herein in its entirety.

REFERENCE SIGNS LIST

1000 Content print system
110 Printer
120 Client
130 Print server group
140 Printer server

The invention claimed is:

1. A print server system including a print service which transmits a print job for a registered printer through a network, the print server system comprising:
one or more processors; and
one or more computer-readable media storing one or more programs, the one or more programs comprising instructions that, when executed by the one or more processors, cause the one or more processors to perform operations comprising:
receiving a request for registering a printer, information on the printer to be registered, and information on a proxy having a function of receiving a print job from the print service and transmitting the print job to the printer;
determining, when the printer has been registered in the print service, whether the proxy is an enterprise supporting proxy capable of restricting use of the print service in accordance with the received information on the proxy; and
controlling registration by not registering the printer when it is determined that the proxy is the enterprise supporting proxy and by performing multiple registration of the printer by redundantly storing the received information on the printer when it is determined that the proxy is not the enterprise supporting proxy.

2. The print server system according to claim 1, the operations further comprising:
receiving information on a user to be associated with the printer to be registered; and
determining whether a user associated with the printer which has been registered in the print service matches the user to be associated with the printer to be registered in accordance with the received information on the user, and when the same user is detected, registration of the printer is not performed whereas when the same user is not detected, it is determined whether the proxy corresponds to the enterprise supporting proxy.

3. The print server system according to claim 1, the operations further comprising:
provide providing a screen showing a corresponding method for using the printer which has been registered in the print service when registration of the printer is not performed in the controlling step.

4. The print server system according to claim 3, the operations further comprising:
when it is determined that the proxy is not the enterprise supporting proxy, providing a screen including a message stating that a sharing setting is to be set on a printer which has been registered while being associated with another user.

5. The print server system according to claim 1, the operations further comprising:
when the printer has been registered in the print service as a printer which receives a print job without using an information processing apparatus including the proxy, controlling registration by not registering the printer to be registered.

6. The print server system according to claim 3, the operations further comprising:
when the printer has been registered in the print service as a printer which receives a print job without using an information processing apparatus including the proxy,
providing a screen including a message representing that re-registration is performed after the registration of the printer is cancelled when a user associated with the printer which has been registered in the print service matches a user to be associated with the printer to be registered, and
providing a screen including a message stating that a sharing setting is to be set for the printer which has been registered while being associated with another user when the user associated with the printer which has been registered in the print service does not match the user to be associated with the printer to be registered.

7. The print server system according to claim 1, wherein the enterprise supporting proxy capable of restricting use of the print service has a function of performing restriction such that a print job which does not satisfy a policy is not transmitted to printers.

8. A print server system including a print service which transmits a print job for a registered printer through a network, the print server system comprising:
one or more processors; and
one or more computer-readable media storing one or more programs, the one or more programs comprising instructions that, when executed by the one or more processors, cause the one or more processors to perform operations comprising:
receiving a request for registering a printer which performs printing through a proxy having a function of receiving a print job from the print service and transmitting the print job to the registered printer and further receive information on the printer to be registered; and
controlling registration by not performing registration of the printer when the printer has been registered in the print service and the proxy is an enterprise supporting proxy capable of restricting use of the print service, and by performing multiple registration of the printer by redundantly storing the received information on the printer when the printer has been registered in the print service and the proxy is not the enterprise supporting proxy capable of restricting use of the print service.

9. A method for controlling a print server system including a print service which transmits a print job for a registered printer through a network, the method comprising:
receiving a request for registering a printer, information on the printer to be registered, and information on a proxy having a function of receiving a print job from the print service and transmitting the print job to the printer;
determining, when the printer has been registered in the print service, whether the proxy is an enterprise supporting proxy capable of restricting use of the print service in accordance with the received information on the proxy; and
controlling registration by not registering the printer when it is determined that the proxy is the enterprise supporting proxy and by performing multiple registration of the printer by redundantly storing the received information on the printer when it is determined that the proxy is not the enterprise supporting proxy.

10. The method according to claim 9, further comprising:
receiving information on a user to be associated with the printer to be registered; and
determining whether a user associated with the printer which has been registered in the print service matches the user to be associated with the printer to be registered in accordance with the received information on the user, and when the same user is detected, registration of the printer is not performed whereas when the same user is not detected, it is determined whether the proxy corresponds to the enterprise supporting proxy.

11. The method according to claim 9, further comprising:
providing a screen showing a corresponding method for using the printer which has been registered in the print service when registration of the printer is not performed in the controlling step.

12. The method according to claim 11, further comprising:
when it is determined that the proxy is not the enterprise supporting proxy, providing a screen including a message stating that a sharing setting is to be set for a printer which has been registered while being associated with another user.

13. The method according to claim 9, further comprising:
when the printer has been registered in the print service as a printer which receives a print job without using an information processing apparatus including the proxy, controlling registration by not registering the printer to be registered.

14. The method according to claim 11, further comprising:
when the printer has been registered in the print service as a printer which receives a print job without using an information processing apparatus including the proxy,
providing a screen including a message stating that re-registration is performed after the registration of the printer is cancelled when a user associated with the printer which has been registered in the print service matches a user to be associated with the printer to be registered, and
providing a screen including a message representing that a sharing setting is to be set for the printer which has been registered while being associated with another user when the user associated with the printer which has been registered in the print service does not match the user to be associated with the printer to be registered.

* * * * *